H. M. PILKINGTON.
PROCESS OF FORGERY DETECTION.
APPLICATION FILED MAR. 5, 1913.

1,135,919.

Patented Apr. 13, 1915.

WITNESSES

INVENTOR
Herbert Morris Pilkington,
BY
Kenyon & Kenyon,
ATTORNEYS

UNITED STATES PATENT OFFICE.

HERBERT MORRIS PILKINGTON, OF ARVERNE, NEW YORK, ASSIGNOR, BY MESNE ASSIGNMENTS, TO LITHOTEX CORPORATION, OF NEW YORK, N. Y., A CORPORATION OF NEW YORK.

PROCESS OF FORGERY DETECTION.

1,135,919.      Specification of Letters Patent.      Patented Apr. 13, 1915.

Application filed March 5, 1913. Serial No. 752,233.

*To all whom it may concern:*

Be it known that I, HERBERT MORRIS PILKINGTON, a citizen of the United States, and a resident of Arverne, Long Island, county of Queens, and State of New York, have invented a certain new and useful Improvement in Processes of Forgery Detection, of which the following is a specification.

The invention relates to improvements in processes of forgery detection, and more especially of prints, engravings and the like.

The main object of the invention is to provide a simple and efficient process by which forged or spurious prints, engravings or the like, may be easily and quickly detected, even when such forgeries are made in the most skillful manner.

Further objects, features and advantages will more clearly appear from the detailed description given below taken in connection with the accompanying drawings which form a part of this specification.

Figure 1:
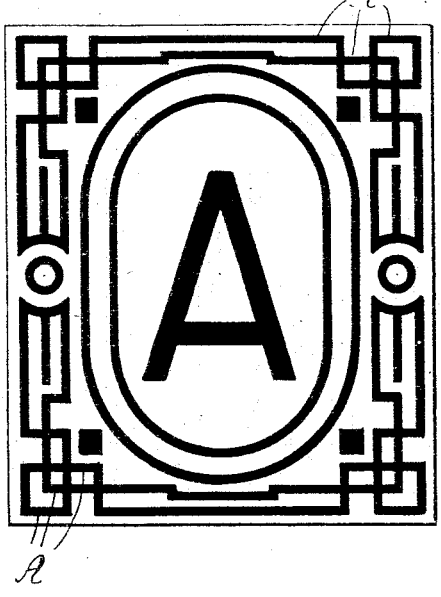
Figure 4:
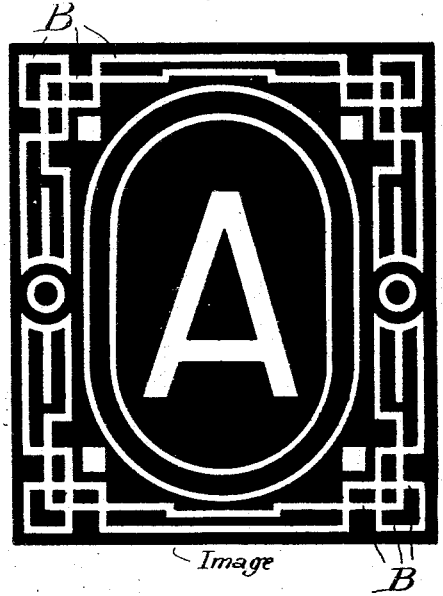
Figure 2:
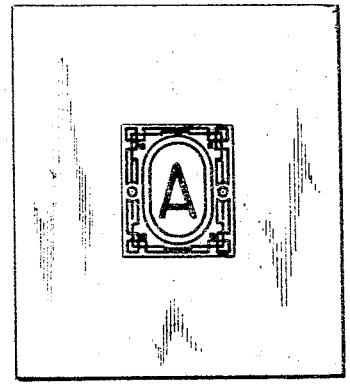
Figure 3:
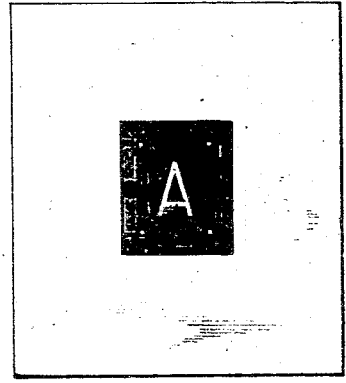

In the drawings, Figure 1 represents a standard or original with which the forgery is to be compared; Fig. 2 represents a small transparency corresponding to the original or standard; Fig. 3 represents a transparency produced on a small scale of the supposed forgery; and Fig. 4 represents the image projected by the transparency of the supposed forgery.

In the making of prints, engravings and the like photographically, it is convenient to first make an original, and then to make a photographic transparency of the original upon a relatively small scale, and then from this relatively small photographic transparency or plate (usually glass) to make the ultimate plates from which the issue of prints, engravings or the like, are printed or made.

In carrying out the improved process in the preferred form, there is made from the small photographic plate or transparency, and by the same lens with which it was made, and with which the plates for making the genuine prints, etc., were made, a standard transparency on a relatively large scale. This standard transparency is made upon material which will not stretch or warp, such as glass, and is kept ready for use for the purpose of detecting forgery at any time, according to the improved process.

Whenever a supposed forgery is found, a photographic plate or transparency of the same is made preferably by the same lens with which the standard transparency was made, the transparency of the supposed forgery being preferably relatively small, and then an image is projected from this transparency with the same lens onto the large permanent standard transparency, and of such size as to register therewith, preferably said small transparency being a complement of the standard or larger transparency—that is, one being a positive and the other a negative. If the supposed forgery is, in fact, a genuine print or the like, the black portions of the projected image of the smaller transparency will fall upon the corresponding transparent portions of the standard, and likewise, the light rays projected through the transparent portions of the small plate or transparency will fall upon and register with the corresponding opaque portions of the standard, the image fitting into the standard like a matrix, so to speak, so that no light rays will pass through the standard. On the other hand, if the supposed forgery be in fact a forgery, then when the slight differences, which necessarily occur therein, are thus magnified and the lines of one projected upon the other, there will be certain transparent lines or spaces on the standard transparency which will not be covered by the corresponding dark spaces or lines of the image projected from the small transparency of the supposed forgery, and consequently the two will not register, and certain light rays will be seen to pass through the standard, thus at once showing that the supposed forgery is, in fact, such.

Since it is very difficult, if not impossible, to get any two lenses exactly alike, there will in most all cases be a difference between the forgery and the original, even when the forgery is made photographically from the original, and this difference will become quite prominent when compared according to the improved process. But since the standard transparency and the transparency of the supposed forgery are, according to the preferred form of the process, made through the same lens, there can be no possible discrepancies between the standard transparency and the print to be tested, due to lens variations.

In the preferred manner of practising the process the same lens is used throughout for producing a small transparency (from which the true prints or engravings are produced), the large or standard transparency, the small transparency of the original forgery and for projecting the image from the same onto the standard. But if the standard is not made with the same lens with which the smaller plate or transparency was made from which the genuine prints were produced, then it is only important from the standpoint of lens imperfection, to use the same lens in making the standard, the small transparency of the alleged forgery, and for projecting one onto the other. This is an important feature, for, as above explained, any two lenses are seldom, if ever, alike, and by using the same lens throughout, any imperfection will equally affect all parts of the process, and thus agreement would be found when making the final comparison if no forgery exists.

Fig. 1 represents the standard transparency which it will be seen contains black distinctive lines A, although a few lines are shown for convenience, and these, for the same reason, are wider than would be actually employed in proportion to the size of the figure shown, but it will be understood that there may be many of these, so that it becomes practically impossible for any one, by hand, to precisely imitate the same from a small scale of the print such as is to be issued.

Fig. 2 represents the transparency on a reduced scale corresponding to the standard transparency and which has been formed from the original. This transparency is preferably made to exactly correspond with the original according to the prints or engravings which are to be made—that is, so that the lines on the original being black are black on the transparency.

Fig. 3 represents the transparency produced on a small scale from a print which it is desired to compare with the original or standard to ascertain whether it is a genuine print or forgery. This transparency is preferably made to be the complement of the print from which it is taken—that is to say, what would be black or colored lines on the print are made to appear white, that is, as clear spaces on the transparency.

Fig. 4 shows the image projected from the transparency of Fig. 3, and it will be seen that the lines B therein are white or clear spaces. If the print from which the transparency of Fig. 3 was taken is a true print, then the black spaces of Fig. 4 will exactly coincide with the white spaces of Fig. 1, and the white or clear spaces of Fig. 4 will fall exactly upon the black lines of Fig. 1, provided the image is brought to precisely the same scale as Fig. 1, and is adjusted at such focus as to register therewith.

While it is preferred to make the so-called standard transparency at the time that the genuine prints are made so that it may be filed away and preserved, yet the standard may be made photographically directly from one of the genuine prints, engravings or the like, at the time that the forgery is to be detected, provided one of the original or genuine prints is available, it only being important to secure the most accurate and reliable results, that the same lens be used in making this standard as is used in making the transparency of the supposed forgery, and in projecting the image of the same onto the standard. Furthermore, it is not necessary to the broadest aspects of the invention that the comparison of the two be made by superposition by projection in the manner stated, as they may be compared by superposition in any other suitable way which will bring out the differences between the two.

Although the improvements have been described in great detail with respect to the preferred form of the invention, nevertheless it is not desired to limit the invention to such details, except as clearly pointed out in the appended claims, since various modifications and changes may well be made in the process without departing from the spirit and scope thereof in its broader aspects.

Having fully and clearly described the improvements, what is claimed as new, and desired to be secured by Letters Patent, is:

1. The improved process of detecting forged prints, engravings and the like, which consists in making a copy of the original photographically through a lens, making a copy of the supposed forgery or the like photographically through a lens, and then comparing by projecting by means of a lens, the image of one copy upon the other copy and of the same size thereas.

2. The improved process of detecting forged prints, engravings and the like, which consists in making a copy of the original photographically through a lens, making a copy of the supposed forgery or the like photographically through the same lens, and then comparing by projecting by means of the same lens, the image of one copy upon the other copy and of the same size thereas.

3. The improved process of detecting forged prints, engravings and the like, which consists in making a copy of the original photographically through a lens, making a copy of the supposed forgery or the like photographically through the same lens, both of said copies being transparent, and then comparing by superimposing by means of the same lens, the image of one copy upon the other and of the same size thereas.

4. The improved process of detecting forged prints, engravings and the like, which consists in making a copy of the original photographically through a lens upon a plate which will not warp or stretch, making a copy of the supposed forgery or the like photographically through the same lens upon a plate which will not warp or stretch, one of said copies being transparent and one smaller than the other, and then comparing the two by projecting by means of the same lens, the image of one copy onto the other and of the same size thereas.

5. The improved process of detecting forged prints, engravings and the like, which consists in making a copy of the original photographically through a lens, upon a glass plate, making a copy of the supposed forgery or the like photographically through the same lens upon a glass plate, one of said copies being smaller than the other and one a positive and the other a negative, and then comparing the two by projecting by means of the same lens, the image of one copy onto the other and of the same size thereas.

6. The improved process of detecting forged or spurious prints, engravings and the like, which consists in making a transparency photographically on a relatively small scale from which the original prints, engravings or the like are made, making a transparency photographically on material which will not stretch or warp and on a relatively large scale from the small transparency, making a transparency photographically of the supposed forgery with the same lens as was used in making the standard, and then projecting with said last lens an image from the transparency of the supposed forgery onto the relatively large standard transparency at such focus as to register therewith.

7. The improved process of detecting forged or spurious prints, engravings and the like, which consists in making a transparency photographically on glass on a small scale from which the original prints, engravings or the like are made, making a transparency photographically and with the same lens as a standard on material which will not stretch or warp, and on a relatively large scale from the small transparency, making a transparency of the supposed forgery photographically with the same lens on glass on a relatively small scale, said last-mentioned transparency being a complement of the standard, that is, one being positive and the other negative, and then projecting with the same lens an image from the transparency of the supposed forgery onto the relatively large standard transparency at such focus as to register therewith.

In testimony whereof, I have signed my name to this specification, in the presence of two subscribing witnesses.

HERBERT MORRIS PILKINGTON.

Witnesses:
SAMUEL M. WARD, Jr.,
EDWIN SEGER.